United States Patent [19]
Bula

[11] 3,934,633
[45] Jan. 27, 1976

[54] ANTISKID DEVICE FOR VEHICLE TIRES

[76] Inventor: Karl Bula, Gladiolenstrasse 2, Seuzach, Switzerland

[22] Filed: Feb. 25, 1975

[21] Appl. No.: 552,951

[30] Foreign Application Priority Data
Feb. 27, 1974 Switzerland............. ........ 2773/74
Jan. 15, 1975 Switzerland........................... 450/75

[52] U.S. Cl. ................. 152/221; 152/222; 152/171
[51] Int. Cl.² ........................................ B60C 27/08
[58] Field of Search ........... 152/170, 171, 172, 173, 152/185, 187, 213 R, 213 A, 217, 218, 219, 221, 222, 231, 239, 240, 241, 243, 244, 245

[56] References Cited
UNITED STATES PATENTS

| | | | |
|---|---|---|---|
| 1,342,753 | 6/1920 | McGeorge | 152/170 |
| 1,388,264 | 8/1921 | Keavey | 152/170 |
| 2,341,316 | 2/1944 | Ederer | 152/170 |
| 2,346,477 | 4/1944 | Ederer | 152/221 |
| 3,842,881 | 10/1974 | Muller et al. | 152/213 A |

Primary Examiner—Drayton E. Hoffman
Assistant Examiner—Larry H. Martin
Attorney, Agent, or Firm—Roylance, Abrams, Berdo & Kaul

[57] ABSTRACT

An annular meshwork to cover the tread and part of the sidewalls of a tire includes a plurality of flexible, nonstretchable strands extending around the tire, each strand being connected to adjacent strands at spaced apart points to form an annular meshwork or network to improve traction and steering. The sides of the meshwork are defined by end rings, at least one of which is extensible, e.g., elastic, to allow mounting on the tire. The strands adjacent the end rings are fixedly attached to the end rings. The meshes are formed by the strands with a significantly longer dimension in the circular direction of the annular meshwork than in the transverse direction. The connections can be made using clamping devices of which specific embodiments are disclosed. The clamping devices can be provided with a protective layer on the tread-facing (inner) side. The outer side can be provided with projections in the nature of short spikes to enhance traction. The inner end ring can be made using a steel strip bent into a ring and surrounded by a spiral ring, the ends of the strip being overlapping and provided with a locking clamp to reduce the ring diameter after installation on a tire.

19 Claims, 14 Drawing Figures

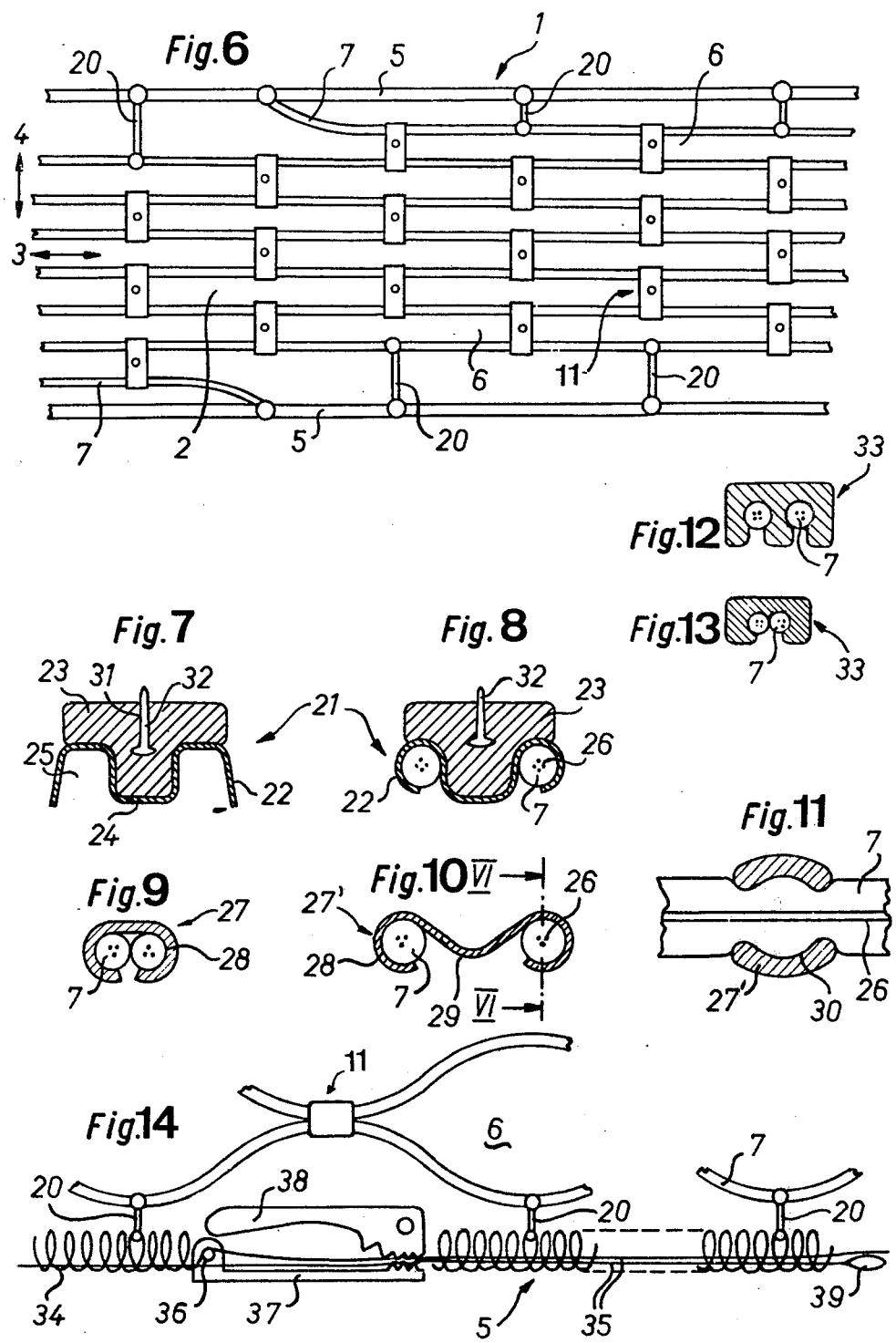

ANTISKID DEVICE FOR VEHICLE TIRES

This invention relates to an antiskid device for vehicle tires and particularly to an improved structure having a meshwork to cover the tread and at least part of the tire sidewalls.

Numerous types of antiskid devices for the driving wheel of vehicles are known, particularly in the form of snow chains. Various constructions of these chains are employed, depending upon the primary function which they are to fulfill. If good steering and adequate grip are required, steering being the primary consideration, then such snow chains are produced with rows of chain links extending circularly with respect to the tire, each link being approximately parallel to a tangent line to the tire. If, however, traction is the primary requirement, then the chains are more frequently constructed with the rows of links extending transversely, approximately parallel to the tire axis. Generally speaking, presently known chain constructions are not constructed in a manner which insures both good steering and a completely satisfactory traction characteristic.

As is well known, particular difficulty is encountered in mounting the chain assembly on the vehicle wheels. Here again, a wide variety of construction techniques have been employed, but all present the disadvantage of requiring considerable time and effort in fitting the chains to the tires. Furthermore, because of the difficulty in mounting them on the tires, particularly in the open under adverse weather conditions, chains are simply frequently not used at all. This is particularly true due the fact that when mounting the chains at least the side chains which are arranged on either side of the tire tread and form the lateral limit of the snow chain must be opened or detached at at least one point. Then, when the chain has been loosely applied to the tire, the opened portions of the chain must be closed and tightened so that the chain does not create noise when the vehicle is travelling. It is generally necessary after fitting the snow chain to the tire to travel a certain distance, after which the chain must be retightened.

It is also known to provide traction devices resembling netting in an effort to overcome the disadvantages of chain structures. However, such netting or meshwork structures have not been sufficiently durable and have not significantly improved the traction and steering characteristics provided by chains, and therefore have not received wide acceptance.

Accordingly, it is an object of the present invention to produce a meshwork antiskid device which is capable of low cost manufacture and which is simply and easily fitted on a mounted vehicle wheel and which, when mounted, does not require reduction of travelling speed and does not impair either the antiskidding action or the steering action of the vehicle.

Briefly described, the present invention involves a meshwork antiskid device including first and second end rings intended to lie on either side of the tire, a plurality of flexible, substantially nonextensible hooplike strands in approximate side-by-side relationship between the end rings, and a plurality of connecting devices for connecting spaced-apart points on each of the strands to the next adjacent strands and for connecting points on those ones of the strands adjacent the end rings to those rings, the point of connection being alternately circularly offset to form an annular meshwork between the rings, the meshes thus formed being longer in the circular direction of the meshwork than in a transverse direction, the meshwork being significantly more expansible in directions perpendicular to tangents of the annular meshwork than in directions parallel to the tangents, so that the meshwork can be placed around a vehicle tire to cover the tread and a portion of each sidewall thereof.

In order that the manner in which the foregoing and other objects are attained in accordance with the invention can be understood in detail, particularly advantageous embodiments thereof will be described with reference to the accompanying drawings, which form a part of this specification, and wherein:

FIG. 6 is a schematic representation of a portion of an antiskid device according to the invention before application to a tire;

FIGS. 7 and 8 are vertical sections through a connecting device usable in the apparatus of FIG. 6;

FIGS. 9 and 10 are vertical sections through a further embodiment of a connection clamp usable in conjunction with the present invention;

FIG. 11 is a side elevation, in section, showing the apparatus of FIG. 10;

FIGS. 12 and 13 are vertical sections of two additional embodiments of clamping devices; and FIG. 14 is a partial plan view of a further embodiment of an end ring in accordance with the invention.

As will be seen, the invention is based on the consideration that a readily adhering skid protection system is obtained if the tire tread is covered with a relatively coarse meshwork or network which is stressed when placed under a tensile load. In the present invention, this is achieved as a result of the fact that the meshes formed by the strands and connection devices to be described have a larger dimension in the direction tangent to the tire periphery than transverse thereto, and, at the same time, that the meshwork is expandable laterally and substantially nonexpandable circularly. Furthermore, it is a feature of the invention that the antiskid device must, to the extent possible, have no parts which need to be opened or detached and then subsequently closed or attached again after mounting the device on the tire. Accordingly, those portions defining the lateral limits of the antiskid device are formed from elastic end rings, these rings having sufficient elasticity to permit them to be easily fitted over the largest tire periphery for which the structure is designed. It will additionally be noted that the circumference of the network can also be increased by laterally telescoping or collapsing the meshes by moving the end ring members toward each other and expanding them and by collapsing the remainder of the network in a lateral direction, thus facilitating the ease with which the structure can be placed on the tire. It is not important, in this connection, that the network is initially only partly fitted on the tire and the final fitting thereto only takes place after rotating the wheel. As both of the ring members and the network form endless closed loops, even when partially fitted the antiskid device cannot fall from the tire. It is also an important feature of the invention for the edges of the meshwork to be firmly connected to the end rings.

Figure 1:
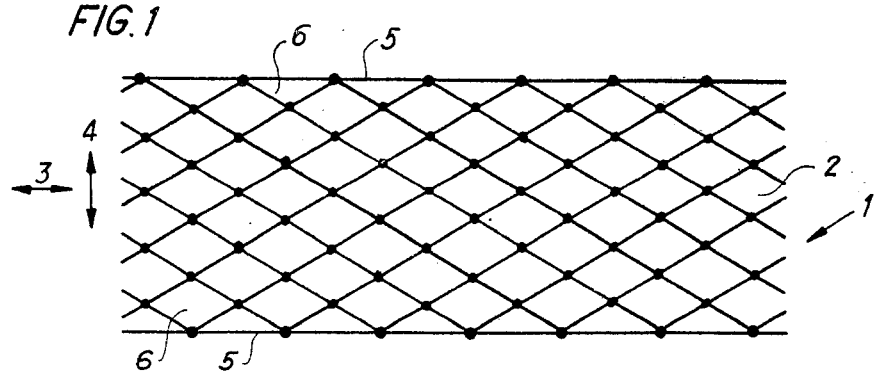
FIG. 1 is a partial plan view of an annular meshwork according to the invention.

Referring now to FIG. 1, it will be seen that the antiskid device comprises a network 1 with rhombic meshes 2 formed by a plurality of interconnected strands so that each mesh has a dimension in the circular tangential direction of the annular meshwork, and of the tire, which is significantly greater than the dimension transverse with respect to the tire. The dimension which is referred to herein as circular or tangential is indicated by the double arrow 3 and the transverse direction is indicated in FIG. 1 by double arrow 4, arrow 4 being essentially parallel to the axis of rotation of the vehicle wheel. In the embodiment shown in FIG. 1, the ratio of the mesh dimension in the direction of arrow 3 to the dimension in the direction of arrow 4 is approximately 2:1. While this ratio need not be exact and can be varied, the important point is that the mesh dimension in the dimension 3 be larger than in direction 4. This relationship can only be ignored in the row of meshes adjacent the end rings 5.

Figure 2:
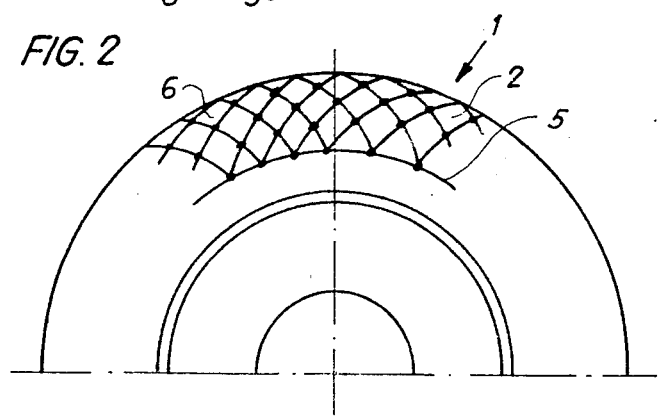
FIG. 2 is a partial side elevation of a vehicle tire showing an antiskid device according to the present invention mounted thereon.
Figure 3:
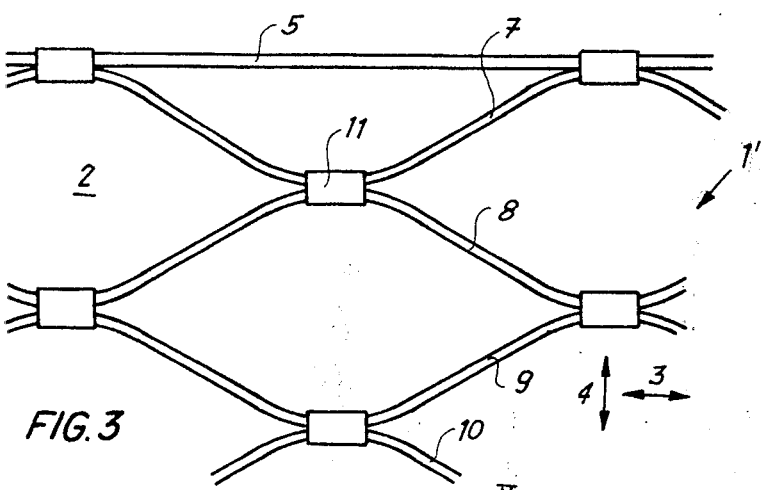
FIG. 3 is an enlarged partial view of the meshwork of FIG. 1.

At the lateral limits of the annular meshwork, at positions which would be along the sidewalls of the tires when the appliance is mounted on a tire, the network 1 is terminated by elastic end rings 5 constructed as closed ring members which are firmly connected with the end meshes 6. As a result, the meshwork 1 is given a specific curvature which facilitates the mounting of the antiskid device on the tire. FIG. 3 shows in more detail an embodiment of the network 1' constructed from individual wire rings 7, 8, 9 and 10. In order to produce network 1', the individual wire hoop-like members or rings 7–10 are alternately connected at uniformly circularly spaced-apart points with adjacent ones of the rings by means of connecting members 11. The points of connection are alternately circularly offset, resulting in a network with meshes 2 of the type shown in FIGS. 1 and 2.

The connecting members 11 can be constructed in various ways with the clamp being formed to encircle adjacent strands, clamping these strands firmly together or by soldering or welding the connection points. An appropriate connection method must be selected for connecting the strands to end rings 5, depending upon the material and construction used for these rings. Vulcanization can be an appropriate technique if the end rings or if the strands are made or coated with rubber.

Figure 4:
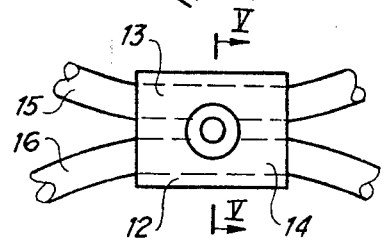
FIG. 4 is an enlarged plan view of a connecting member usable in the apparatus of FIGS. 1–3.
Figure 5:
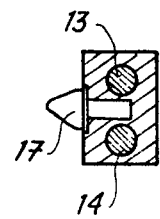
FIG. 5 is a section along lines V—V of FIG. 4.

FIGS. 4 and 5 illustrate a specific connection device including a shaped member 12 which constitutes a clamping member having bores 13 and 14 through which are placed wire rings 15 and 16. The clamping members are shaped so that the wires are held in an immovable fashion. It is also possible to have slots in place of bores 13 and 14.

As can be seen from FIGS. 4 and 5, clamping members 12 can also be constructed as a carrier for receiving additional antiskid means, such as a protrusion in the nature of a spike 17 fixedly mounted in clamping member 12. Because of the fact that the meshwork is so easily mounted and dismounted on a tire, the disadvantages of the well-known studded tire are substantially avoided because the tendency is to employ the antiskid device only when absolutely necessary.

FIG. 6 shows a further embodiment of an antiskid device according to the invention. In FIG. 6 there is shown a meshwork 1 in its relaxed state before being applied to a tire, the meshes in FIG. 6 being rectangular in this relaxed state. When the apparatus is fitted to a tire, the meshes undergo rhombic deformation by transverse expansion of the meshwork. It will be observed that the meshes 2 have a considerably larger dimension in the direction of arrow 3 than in the transverse direction 4, even when the antiskid device is applied to a tire, i.e., particularly on the tire tread periphery. It will be observed that the inner end ring on this structure must be elastically expandable, or expandable in some fashion, and while the other end ring may also be elastically expandable, it need not be as expandable as the inner ring and can, in fact, not be stretchable or expandable at all.

The edge meshes 6, those adjacent the end rings 5, are connected to the end rings in the embodiment of FIG. 6 by connecting members 20. Members 20 can be constructed in various ways and can, for example, be metal clips. As previously mentioned, connecting member 20 can also be a connection resulting from vulcanization, welding or the application of an adhesive.

Meshes 2 and 6 of the antiskid device located between the end rings 5 are formed by cords or strings 7 whereby in each case two juxtaposed cords or strings 7 are interconnected by shaped members 21 constructed as clamping members. The connecting members 20 and members 21 can be produced in various ways, for example, from an elastomer or from a steel strip. In any event, they must perform the function of interconnecting in force locking manner to adjacent cords or strings which serve to form the meshes. Depending on the selective production technique, these cords or strings can be immediately adjacent each other or can be spaced apart from one another at the connection point by a relatively small distance. This is shown in FIG. 6 in an exaggerated manner.

In place of the cords or strings as the strand members, it is also possible to use relatively fine circulating chains which, at the connection points, are connected to each other using chain links or other suitable similarly shaped members in order to form the meshwork. The meshwork can also be formed by a slotted sheath or foil material, optionally reinforced, whereby the connecting members can be part of the expanded sheet material. The important point is that the material used for the meshwork for the formation of the meshes is flexible but substantially nonextensible in the tangential direction so that the antiskid device can be randomly deformed such as to a narrow strip when fitting the appliance to the tire or to a wide meshwork or network engaging with the tire and corresponding with the width of the tire.

FIGS. 7 and 8 show a shaped member 21, in section, this member being formed from a steel clip 22 with a rubber member 23 vulcanized or otherwise adhered to one side of the clip. Clip 22 is provided with two cavities 25 which are separated by a spacing member 24, the cavities serving to receive two adjacent cords or strands 7, which as shown in FIG. 8, are firmly connected to the shaped member 21 by deforming the ends of the clip to partially surround and engage the strands. The strand 7 shown in FIG. 8 is, for example, formed from an elastomer with a steel wire reinforcement 26 at the core thereof. As a result, the strands are substantially nonextensible and have good frictional engagement characteristics and good abrasion resistance.

FIGS. 9–11 show two further shaped members 27 and 27' which can be formed from steel which, like clips 22, have cavities 28 for receiving the strands 7. In the case of member 27 (FIG. 9), two adjacent strands are immediately juxtaposed whereas in the case of member 27' the strands are maintained in spaced-apart relationship by intervening portion 29 (FIG. 10). In order to improve the gripping characteristics of the shaped members 27 and 27' with strand 7, the cross-section of either of these members can be provided with a cavity 30 at the central portion thereof, as shown in FIG. 11, providing a firm connection between the shaped members and the strand when the members are crimped thereon.

As also shown in FIGS. 7 and 8, there can be provided an opening 31 in rubber member 23 in which can be embedded a spike 32 to perform the same function as spike 17 of FIG. 5.

As illustrated in FIG. 6, the strands 7 can actually constitute a single helically wound strand from one end ring to the other. Thus, the entire meshwork portion between the end rings, other than the connecting members, can be formed from a single piece of strand material. The number of turns can be selected in accordance with the tire size. If the number of turns is selected to be uneven, such as the seven turns shown in FIG. 6, shaped members are necessary for each row of connecting points 3. When there is an even number of turns, the number of shaped members necessary per row differs by one.

In FIGS. 12 and 13 there are shown two embodiments of connecting members formed from an elastomer. In these sectional drawings, it will be seen that the strands 7 are maintained in spaced-apart relationship in grooves formed in body 33 while in FIG. 13 the strands are adjacent each other. The strands can be fixed in the grooves by an adhesive or by a vulcanization or other suitable thermal process, depending upon the materials used. Adhesive or vulcanization is also possible for adhering the strands to each other as well as to body 33.

As previously indicated, the end ring 5, at least the one to be located on the inside of the tire, is necessarily expandable. In order to secure the meshwork to the tire in an immovable manner at high travelling speeds, the outside end ring 5 can be made relatively inextensible. However, the inner end ring is sufficiently extensible so that it can be peripherally secured after fitting to the tire. As shown in FIG. 14, end ring 5 comprises a highly elastic portion such as a helical spring 34. A steel strip 35 extends within spring 34, the strip being overlapping at its ends and, preferably, overlaps sufficiently so that it extends one and one-half turns turns around the tire, i.e., approximately 540°. One end of the steel strip is fixed to a bolt 36 of a clamping lock 37, while the other end is freely movable within spiral spring 34 when the clamping lock is in an unclamped or unlocked condition. After fitting the network to the tire, a shackle 38 is moved to the position shown in FIG. 14 in which the portions of the steel strip are clamped between the serrated portions of members 37 and 38, firmly locking the overlapping portions of the steel strip to each other. Thus, the length of the inner strip portion or ring 5 is fixed at the desired length. The distal end of strip 35 can be provided with a rounded end portion 39 to assure free motion within spiral spring 34, i.e., to prevent snagging of the strip end on the spring.

While certain advantageous embodiments have been chosen to illustrate the invention, it will be understood by those skilled in the art that various changes and modifications can be made therein without departing from the scope of the invention as defined in the appended claims.

What is claimed is:

1. An antiskid device for use on a vehicle tire comprising first and second end rings;
    a plurality of flexible, substantially nonextensible hooplike strands in approximate side-by-side relationship between said end rings; and
    a plurality of connection means for connecting spaced-apart points on each of said strands to the next adjacent strands and for connecting points on the ones of said strands adjacent to said end rings to said rings, the points of connection being alternately circularly offset to form an annular meshwork between said rings,
    said meshwork being significantly more expansible in directions perpendicular to tangents of the annular meshwork than in directions parallel to the tangents,
    whereby said meshwork can be placed around a vehicle tire to cover the tread and a portion of each sidewall thereof.

2. A device according to claim 1 wherein the mesh openings in said meshwork are rhombic, the larger diagonals thereof being in directions parallel to tangents of the annular meshwork.

3. A device according to claim 1 wherein at least one of said end rings is formed from an elastic material.

4. A device according to claim 1 wherein one of said end rings comprises
    a steel strip bent to form a hoop with the ends of the strip overlapping;
    a spiral spring surrounding said strip; and
    a clamping lock at the overlapping ends of said strip, said lock being operable to reduce the diameter of the hoop formed by said strip.

5. A device according to claim 1 wherein each of said strands is metal.

6. A device according to claim 1 wherein each of said strands is rubber.

7. A device according to claim 1 wherein each of said strands is formed of textile strings.

8. A device according to claim 1 wherein each of said connection means comprises a clamping member.

9. A device according to claim 8 wherein each said clamping member further comprises a radially protruding spike.

10. A device according to claim 8 wherein each of said clamping members comprises a body with means defining cavities to receive two of said strands, said means being deformable after insertion of said strands to grip said strands in said cavities.

11. A device according to claim 8 wherein each of said clamping members comprises a body having a layer of rubber adhered to the side of said body intended to face the tire tread when said meshwork is placed around the tire.

12. A device according to claim 8 wherein said clamping member comprises a body having means defining a cavity to receive said strands.

13. A device according to claim 12 wherein said body is formed from an elastomer.

14. A device according to claim 8 wherein each of said strands comprises a rubber cord having steel wire reinforcement.

15. A device according to claim 8 wherein one of said end rings is flexible and substantially nonextensible.

16. A device according to claim 8 wherein said strands are formed from a single length of material in a helix extending repeatedly around the meshwork an odd number of times.

17. A device according to claim 8 wherein said strands are formed from a single length of material in a helix extending repeatedly around the meshwork an even number of times.

18. A device according to claim 1, wherein the edges of the meshwork are firmly connected to the end rings.

19. An antiskid device for use on a vehicle tire comprising first and second end rings;
- a plurality of flexible, substantially nonextensible hooplike strands in approximate side-by-side relationship between said end rings;
- a plurality of connection means for connecting spaced-apart points on each of said strands to the next adjacent strands and for connecting points on the ones of said strands adjacent to said end rings to said rings, the points of connection being alternately circularly offset to form an annular meshwork between said rings,
- said ones of said strands adjacent to said end rings being firmly connected to said end rings.

\* \* \* \* \*